UNITED STATES PATENT OFFICE.

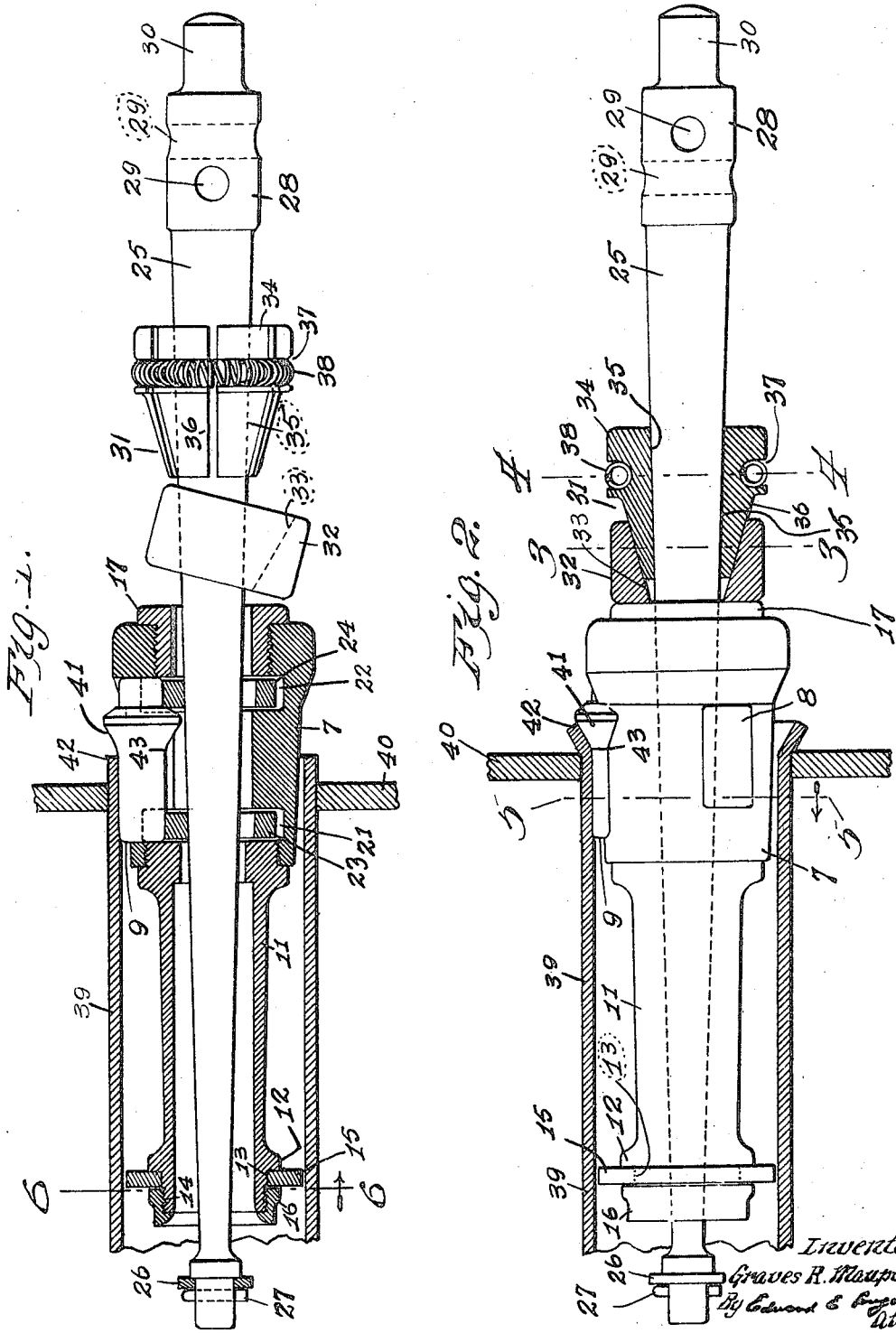

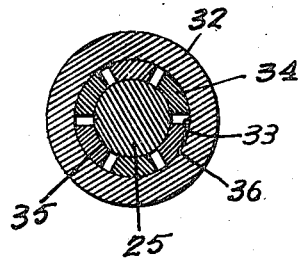
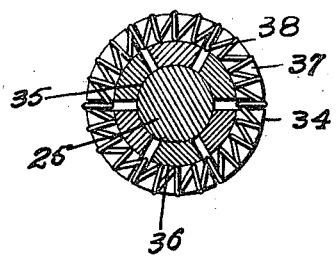
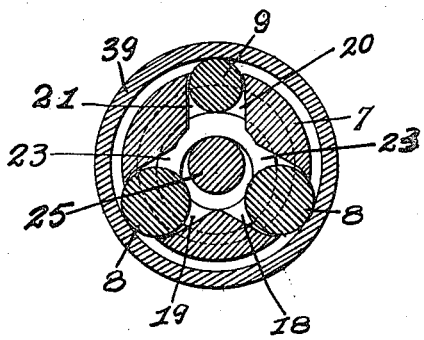
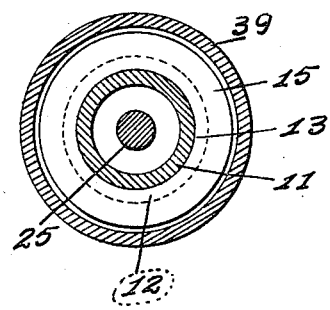

GRAVES R. MAUPIN, OF MOBERLY, MISSOURI, ASSIGNOR TO J. FAESSLER MFG. CO., OF MOBERLY, MISSOURI, A CORPORATION OF MISSOURI.

FLUE EXPANDER AND FLARER.

1,322,921.   Specification of Letters Patent.   Patented Nov. 25, 1919.

Application filed April 1, 1919. Serial No. 286,657.

*To all whom it may concern:*

Be it known that I, GRAVES R. MAUPIN, a citizen of the United States, and resident of Moberly, Missouri, have invented certain new and useful Improvements in Flue Expanders and Flarers, of which the following is a specification containing a full, clear, and exact description, reference being had to the accompanying drawings, forming a part hereof.

This invention relates to certain new and useful improvements in flue expanders and flarers and has for its primary object a stop whereby the inward travel of the expanding mandrel is completely checked and the flaring operation takes place withholding any further expanding of the flue.

A further object is to provide a flue expander with a gage whereby the expanding of the flue may be stopped at any desired point and at the same time provide a means whereby the inserted end of the expander be kept from wabbling.

A further object is to provide a flue expander with a flaring roller and expanding rollers, a gage stop whereby the expansion of the rollers may be halted and a centralizing roller for holding that portion of the flue expander which is inserted in the tube in a relatively central position.

In the drawings:

Figure 1 is a sectional view through a boiler head tube and the expander showing the device as used for expanding the tube with the gage or stop in inoperative position.

Fig. 2 is a view similar to Fig. 1, showing the cage and flue expanding rollers in solid and the gage in section in operative position.

Fig. 3 is a cross section taken on the line 3—3 of Fig. 2.

Fig. 4 is a cross section taken on the line 4—4 of Fig. 2.

Fig. 5 is a cross section taken on the line 5—5 of Fig. 2.

Fig. 6 is a cross section taken on the line 6—6 of Fig. 1.

In the construction of my device, 7 indicates the cage which is of the usual construction, this cage being provided with a pair of expanding rollers 8 and a flaring roller 9, these rollers being at an angle to the longitudinal axis of the cage.

In one end of the cage is screw seated a sleeve 11 which sleeve is provided near its outer end with a collar 12, a bearing surface 13 and screw threads 14. On the bearing surface 14 is located a collar 15 which collar is clamped between the collar 12 and the nut 16, the nut 16, however, only tending to hold the collar 15 in place, so that the same is free to revolve.

In the opposite end of the cage 7 is inserted a nut 17 which tends to hold the several parts together. The cage 7 is provided with openings 18 and 19 in which the expanding rollers are seated and the opening 20 in which the flaring roller 9 is seated. The cage is further provided with grooves 21 and 22 in which the rings or collars 23 and 24 are placed, these collars contacting on their inner faces with the mandrel 25 and their outer faces bearing against each end of the flaring roller 9, this structure being clearly shown in Fig. 1.

The mandrel 25 is tapered as shown in Figs. 1 and 2 and its small end is provided with a retaining washer 26 which is retained in place by means of the cotter pin 27, so that the mandrel cannot be entirely withdrawn from the cage 7. On the inclined surface of this mandrel, the rollers 8 and the rings 23 and 24 ride thereby forcing the rollers 8 and the roller 9 outward. The opposite end of the mandrel 25 is provided with a cylindrical portion 28 through which bores 29 extend, these bores serving as recesses into which the end of a lever may be placed for operating the device.

At the rear of the projection 28 is formed a square end 30 on which a wrench or a motor, driven either by steam, air or the like, may be used.

The gage 31 is composed of a collar 32 having its inner face beveled as indicated by the numeral 33 and a series of split or segmental members 34, these members having their inner surface tapered as indicated by the numeral 35, so as to conform with the taper on the mandrel 25. A portion of the outer surface as indicated by the numeral 36 is tapered to conform with the bore 33 of the collar 32. A portion of each of the segmental members 34 is provided with a groove 37 in which a spring or other contractile material 38 is seated, this tending to bind the members 34 on the mandrel 25.

The operation of my device is as follows:

The cage 7 is inserted into the boiler tube 39 and the mandrel 25 being in far enough to cause the rollers 8 and 9 to bind against the surface. The mandrel is then rotated and the inclination of the rollers to the longitudinal axis of the mandrel 25 will cause the mandrel to feed inwardly, thereby causing the rollers 8 and 9 to ride upon the tapered surface of the mandrel and expand the tube in the boiler head 40. After the boiler tube 39 has been expanded sufficiently to tightly seat it in the head 40 (which can be readily felt by an experienced operator) the stop 31 is pushed forward on the mandrel so that the collar 32 will come in contact with the nut 17 and the inclined faces 36 of the segmental members fit the inclined face 33 of the collar 32. This will hold the mandrel 25 from entering any farther into the cage 7 and keep the rollers 8 and 9 from expanding any farther. The continued turn of the mandrel will have the tendency to feed the mandrel and cage into the tube and then only will the flaring portion 41 of the roller 9 take effect on the end 42 of the boiler tube 39, thereby upsetting or flaring the end of the tube as indicated in Fig. 2.

The roller 9 and the flaring portion 41 thereof form a continuous surface or, in other words, are provided with a fillet as indicated by the numeral 43. The object of this being to provide a smooth and rounded flare on the interior of the surface of the boiler tube and not to pinch the same or cause the tube to be thinned which has been found to be the fault with the present devices.

Having fully described my invention what I claim is:

1. A tube expander and flarer comprising a cage, expanding and flaring rollers mounted in said cage, a mandrel extending through said cage, a shank attached to the cage, a guide roller mounted on the end of said shank, and a movable stop comprising sliding segments and a ring located on said mandrel.

2. A flue expander and flarer comprising a cage, a pair of expanding rollers mounted therein, a combined expanding and flaring roller mounted in said cage, a tapered mandrel mounted in said cage, a stop comprising a ring provided with a flaring opening, and a series of tapering segments slidably held on the mandrel.

3. A flue expander and flarer comprising a cage, a pair of expanding rollers mounted therein, a combined expanding and flaring roller mounted in said cage, a tapered mandrel mounted in said cage, a stop comprising a ring provided with a flaring opening, a shank attached to the cage, a guide roller revolubly mounted on the end of said shank, and a series of tapering segments slidably held on the mandrel.

4. A flue expander and flarer comprising a cage, a pair of expanding rollers mounted therein, a combined expanding and flaring roller mounted in said cage, rings located within the cage and contacting with the ends of the flaring roller, a tapered mandrel mounted in said cage, a stop comprising a ring provided with a flaring opening, a shank attached to the cage, a guide roller revolubly mounted on the end of said shank, and a series of tapering segments slidably held on the mandrel.

In testimony whereof, I have signed my name to this specification, in the presence of two subscribing witnesses.

GRAVES R. MAUPIN.

Witnesses:
JOHN W. FAESSLER,
LOUIS E. FAESSLER.